Patented July 3, 1945

UNITED STATES PATENT OFFICE 2,379,608

2,379,608
COATING COMPOSITIONS CONTAINING CYCLOPARAFFIN TYPE POLYMERS AND OCTYLATED MELAMINE-FORMALDEHYDE RESINS

Robert C. Swain, Riverside, and Pierrepont Adams, Stamford, Conn., assignors to American Cyanamid Company, New York, N. Y., a corporation of Maine No Drawing. Application September 25, 1940, Serial No. 358,284

4 Claims. (Cl. 260—42)

This invention relates to coating compositions containing hydrocarbon polymers of the cycloparaffin type and melamine-formaldehyde resins.

An object of this invention is to improve the physical and chemical properties of coating compositions containing hydrocarbon polymers of the cycloparaffin type, e. g., color stability, resistance to solvents, etc.

Another object of this invention is to provide compositions containing hydrocarbon polymers of the cycloparaffin type and compatible proportions of compatible melamine-formaldehyde resins.

These and other objects are attained by blending hydrocarbon polymers of the cycloparaffin type with a melamine-formaldehyde resin which has been alkylated with an octanol and wherein the molal ratio of formaldehyde to melamine is at least about 4:1.

The following examples in which the proportions are in parts by weight are given by way of illustration and not in limitation. The cycloparaffin polymer used in the following examples is one obtained by hydrogenation of essentially indene polymers (or polymers of mixtures of indene and some coumarone) sold under the trade name "Nevillite #2," having a melting point between about 145° and 155° C. and being prepared in accordance with the procedure set forth by Carmody et al. in "Industrial and Engineering Chemistry," vol. 32, pages 684–692, N. B. page 691.

Example 1

| | Parts |
|---|---|
| Melamine-formaldehyde resin "A" | 10 |
| Cycloparaffin polymer ("Nevillite #2") | 90 |

A composition containing these ingredients is prepared by admixing 20 parts of melamine-formaldehyde resin "A" solution (50% resin) with 180 parts of "Cycloparaffin polymer stock solution" (containing 50% of cycloparaffin polymer and 50% of xylene). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "A" | 25 |
| Cycloparaffin polymer ("Nevillite #2") | 75 |

A composition containing these ingredients is prepared by admixing 50 parts of melamine-formaldehyde resin "A" solution (50% resin) with 150 parts of "Cycloparaffin polymer stock solution." Films of the composition are applied to metal objects and baked at a temperature of about 135° C. for about one-half hour. A clear, tough film is formed.

Example 3

| | Parts |
|---|---|
| Melamine-formaldehyde resin "A" | 50 |
| Cycloparaffin polymer ("Nevillite #2") | 50 |

A composition containing these ingredients is prepared by admixing 100 parts of melamine-formaldehyde resin "A" solution (50% resin) with 100 parts of "Cycloparaffin polymer stock solution." Films of the composition are applied to metal objects and baked at a temperature of about 135° C. for about one-half hour. The product formed is a very hard, clear coating.

Example 4

| | Parts |
|---|---|
| Melamine-formaldehyde resin "A" | 75 |
| Cycloparaffin polymer ("Nevillite #2") | 25 |

A composition containing these ingredients is prepared by admixing 150 parts of melamine-formaldehyde resin "A" solution (50% resin) with 50 parts of "Cycloparaffin polymer stock solution." Films of the composition are applied to metal objects and baked at a temperature of about 135° C. for about one-half hour. A water-white film having good chemical properties is formed.

Example 5

| | Parts |
|---|---|
| Melamine-formaldehyde resin "A" | 90 |
| Cycloparaffin polymer ("Nevillite #2") | 10 |

A composition containing these ingredients is prepared by admixing 180 parts of melamine-formaldehyde resin "A" solution (50% resin) with 20 parts of "Cycloparaffin polymer stock solution." Films of the composition are applied to metal objects and baked at a temperature of about 135° C. for about one-half hour. A hard, transparent film is produced.

Octylated melamine-formaldehyde resins wherein the ratio of formaldehyde to melamine is 5:1 or 6:1 may be substituted for the melamine-formaldehyde resin "A" used in the above examples and similar results are obtained.

Preparation of melamine-formaldehyde resin "A"

| | Parts |
|---|---|
| Melamine-formaldehyde (molal ratio 1:4) spray-dried powder | 200 |
| Octyl alcohol (2-ethyl hexanol) | 280 |
| n-Butanol | 320 |
| Methyl acid phosphate | 4 |

The melamine-formaldehyde condensation product is obtained by refluxing melamine and formalin (37% formaldehyde in water) in the molal ratio of 1:4 at a pH of about 7–9 for about 3 hours and then spray-drying.

The spray-dried melamine-formaldehyde powder, octanol, butanol and methyl acid phosphate are heated to about 100–105° C. in 30 minutes and refluxed about 30 minutes. This solution is vacuum concentrated at about 50-70° C. to form a product containing about 50% solids.

Cycloparaffin polymers suitable for use according to our invention may be prepared by hydrogenating indene polymers, mixed indene-coumarone polymers, coumarone polymers, etc., and they may also be produced by polymerizing various mixtures of unsaturated compounds of the cyclohexane series and the cyclopentane series. Such unsaturated materials may contain not only monoolefines, but diolefines and they may be polymerized by the use of suitable catalysts such as boron trifluoride, aluminum chloride, sulfuric acid, etc. Preferably products suitable for our invention are essentially hydrogenated indene polymers having a melting point between about 145° and 160° C. The preparation of products of this type is described by Carmody et al., loc. sit., Patents Nos. 2,128,985, 2,128,984, 2,139,722 (see especially Example 1) and 2,152,533.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. The condensation may be carried out either with or without an acid catalyst and in some instances basic catalysts may desirably be utilized.

The melamine-formaldehyde resins vary slightly according to minor variations in control during their production and in some instances small proportions of a suitable solvent material, e. g., benzene, xylene, toluene, acetone, etc., may be added to the original solutions of hydrocarbon polymers and melamine-formaldehyde resin in order to produce perfectly clear solutions if such solutions are not originally obtained.

While formaldehyde has been used in the previous examples, it will be obvious that other aldehydes such as various polymers of formaldehyde, e. g., paraformaldehyde, or substances which yield formaldehyde may be used in place of part or all of the formaldehyde.

The melamine-formaldehyde resins may be alkylated with octyl alcohol (2-ethyl hexanol) as in the above examples or the resins may be alkylated with other octyl alcohols or mixtures of octyl alcohols. The term "alkylated melamine-formaldehyde resin" is intended to denote compositions which are reacted with an alcohol.

Hydrocarbon polymers of the cycloparaffin type have been found to be compatible with octylated melamine-formaldehyde resins wherein the molal ratio of formaldehyde to melamine is at least about 4:1. While ratios of formaldehyde to melamine higher than 6:1 may be used, it is generally undesirable inasmuch as formaldehyde is lost during the curing so that usually the product in its cured condition does not contain more than about 6 mols of formaldehyde to 1 mol of melamine.

Our compositions may be used in admixture with other resinous compositions, e. g., urea-formaldehyde resins, phenol-formaldehyde resins, nitrocellulose, ester gum, etc. They may also be used in drying oil vehicles such as linseed oil and the like.

A wide variety of plasticizers may be incorporated into our products such as the alkyl phthalates, tricresyl phosphate, some modified alkyds, etc.

Various fillers, pigments, dyes and lakes may be added to our compositions, e. g., lithopone, zinc oxide, titanium oxide, ferric oxide, Prussian blue, toluidine red, malachite green, mica, ground glass, glass fibers, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Films of our mixed hydrocarbon polymers and alkylated melamine-formaldehyde resins are useful in varnishes, lacquers and other coating compositions. Such compositions are very resistant to corrosive and weathering conditions, as well as being resistant to acid and alkali, thereby rendering them especially suitable for use in coating compositions, particularly concrete enamels and various interior finishes. Our compositions are substantially odorless and tasteless and therefore are of use as protective coatings for food and beverage containers.

One advantage of our melamine-formaldehyde resin-hydrocarbon polymer mixtures of especial importance is in the reduced solubility and thermoplasticity as compared to compositions containing only cycloparaffin type polymers.

Obviously many modifications and variations in the processes and compositions described above may be made without departing from the spirit and scope of the invention as defined in the appended claims.

We claim:

1. A coating composition containing solid hydrocarbon polymers of the cycloparaffin type obtained by hydrogenating a substance selected from the group consisting of indene polymers, mixed indene-coumarone polymers and coumarone polymers, and a melamine-formaldehyde resin which has been reacted with an octanol wherein the molal ratio of formaldehyde to melamine is at least about 4:1.

2. A coating composition containing solid hydrocarbon polymers of the cycloparaffin type obtained by hydrogenating a substance selected from the group consisting of indene polymers, mixed indene-coumarone polymers and coumarone polymers, and a melamine-formaldehyde resin which has been reacted with 2-ethyl hexanol wherein the molal ratio of formaldehyde to melamine is at least about 4:1.

3. A coating composition containing solid hydrocarbon polymers of the cycloparaffin type obtained by hydrogenating materials which are essentially polymerized indene, and a melamine-formaldehyde resin which has been reacted with 2-ethyl hexanol wherein the molal ratio of formaldehyde to melamine is at least about 4:1.

4. A coating composition containing hydrocarbon polymers of the cycloparaffin type obtained by hydrogenating a substance selected from the group consisting of indene polymers, mixed indene-coumarone polymers and coumarone polymers, and having a melting point between about 145° and 155° C. and a melamine-formaldehyde resin which has been reacted with 2-ethyl hexanol wherein the molal ratio of formaldehyde to melamine is at least about 4:1.

ROBERT C. SWAIN.
PIERREPONT ADAMS.